United States Patent
Sei

(10) Patent No.: US 11,123,875 B2
(45) Date of Patent: Sep. 21, 2021

(54) WORK ASSEMBLING DEVICE, CONTROL METHOD FOR WORK ASSEMBLING DEVICE, CONTROL PROGRAM FOR WORK ASSEMBLING DEVICE, AND RECORDING MEDIUM

(71) Applicant: KANAE KOGYO Co., Ltd., Shizuoka (JP)

(72) Inventor: Yukio Sei, Shizuoka (JP)

(73) Assignee: KANAE KOGYO Co., Ltd., Shizuoka (JP)

( * ) Notice: Subject to any disclaimer, the term of this patent is extended or adjusted under 35 U.S.C. 154(b) by 225 days.

(21) Appl. No.: 16/307,670

(22) PCT Filed: Oct. 19, 2016

(86) PCT No.: PCT/JP2016/081027
§ 371 (c)(1),
(2) Date: Dec. 6, 2018

(87) PCT Pub. No.: WO2018/073922
PCT Pub. Date: Apr. 26, 2018

(65) Prior Publication Data
US 2019/0176340 A1  Jun. 13, 2019

(51) Int. Cl.
*B25J 13/00* (2006.01)
*B23P 19/02* (2006.01)
(Continued)

(52) U.S. Cl.
CPC .............. *B25J 13/00* (2013.01); *B23P 19/02* (2013.01); *B23P 19/04* (2013.01); *B25J 9/06* (2013.01);
(Continued)

(58) Field of Classification Search
CPC .................. B23P 19/04; F16D 41/064; G05B 2219/45064
See application file for complete search history.

(56) References Cited

U.S. PATENT DOCUMENTS 3,192,615 A * 7/1965 Halverson ............... B23P 19/04
227/100
3,668,773 A * 6/1972 Achterberg ............. B23P 19/04
29/429
(Continued)

FOREIGN PATENT DOCUMENTS

CN    105690418 A    6/2016
JP    H10-094930 A   4/1998
(Continued)

OTHER PUBLICATIONS

WO2008032591 A1 Translation (Year: 2008).*
International Search Report issued in PCT/JP2016/081027; dated Dec. 6, 2016.

*Primary Examiner* — Jeff A Burke
*Assistant Examiner* — Kyle T Johnson
(74) *Attorney, Agent, or Firm* — Studebaker & Brackett PC

(57) ABSTRACT

A robot 140 includes a control unit 160 configured such that a reference line L connecting a root portion of a first arm (upper arm 143) and an end portion of a second arm (forearm 144) is assumed on a main plane determined in a space where the robot 140 is installed, an angle β formed by the first arm (upper arm 143) and the reference line L is decreased while increasing a crossing angle α between the first arm (upper arm 143) and the second arm (forearm 144) on the side facing the reference line L, the end portion of the second arm (forearm 144) is moved in a work pressurizing direction (F direction) which is determined to be along the reference line L, and a work pressurizing unit (push-in unit
(Continued)

153) is pressurized in the work pressurizing direction (F direction) by the end portion of the second arm (forearm 144).

6 Claims, 11 Drawing Sheets

(51) Int. Cl.
| | |
|---|---|
| *B25J 9/06* | (2006.01) |
| *B23P 19/04* | (2006.01) |
| *B25J 9/16* | (2006.01) |
| *G05B 19/4155* | (2006.01) |
| *F16H 41/28* | (2006.01) |
| *F16D 41/064* | (2006.01) |

(52) U.S. Cl.
CPC ............ *B25J 9/1687* (2013.01); *F16H 41/28* (2013.01); *G05B 19/4155* (2013.01); *F16D 41/064* (2013.01); *G05B 2219/45064* (2013.01)

(56) References Cited

U.S. PATENT DOCUMENTS

| | | | | |
|---|---|---|---|---|
| 4,133,091 A * | 1/1979 | Ito | ............ | F16H 41/28 |
| | | | | 29/243.5 |
| 4,575,934 A * | 3/1986 | Kitamura | ................ | B23P 19/04 |
| | | | | 29/787 |
| 4,594,670 A * | 6/1986 | Itoh | ........................ | G05B 19/19 |
| | | | | 318/568.22 |
| 4,987,765 A * | 1/1991 | Nishimura | ........... | B21D 43/105 |
| | | | | 29/33 J |
| 5,109,604 A * | 5/1992 | Koebele | .................. | F16H 41/28 |
| | | | | 29/889.21 |
| 5,749,141 A * | 5/1998 | Matsumoto | ............. | B23P 19/02 |
| | | | | 29/221.5 |
| 6,167,607 B1 * | 1/2001 | Pryor | .................... | A01B 69/008 |
| | | | | 29/407.04 |
| 6,250,174 B1 | 6/2001 | Terada et al. | | |
| 2003/0131459 A1 * | 7/2003 | Morita | ................ | B25B 23/0078 |
| | | | | 29/242 |
| 2006/0151089 A1 * | 7/2006 | Kawamori | .............. | C03C 27/10 |
| | | | | 156/109 |
| 2007/0239315 A1 * | 10/2007 | Sato | ........................ | B25J 9/1612 |
| | | | | 700/245 |
| 2010/0162546 A1 * | 7/2010 | Kalmar | .................. | F01D 5/005 |
| | | | | 29/244 |
| 2010/0326965 A1 * | 12/2010 | Hasegawa | ............ | B23K 11/067 |
| | | | | 219/117.1 |
| 2012/0239194 A1 * | 9/2012 | Kagawa | .................. | B25J 9/1692 |
| | | | | 700/254 |
| 2013/0189903 A1 * | 7/2013 | Kudas | ................. | B24B 27/0038 |
| | | | | 451/5 |
| 2016/0075030 A1 * | 3/2016 | Takahashi | ............... | B25J 9/1687 |
| | | | | 700/253 |
| 2016/0167236 A1 | 6/2016 | Kato | | |
| 2017/0209968 A1 * | 7/2017 | Mizumoto | ........... | B25J 15/0019 |
| 2018/0009075 A1 * | 1/2018 | Maeda | .................. | B25J 9/1697 |
| 2019/0176340 A1 * | 6/2019 | Sei | ...................... | G05B 19/4155 |
| 2019/0276164 A1 * | 9/2019 | Ishida | .................... | B23P 21/002 |
| 2020/0070340 A1 * | 3/2020 | Kurtz | ....................... | B25J 9/163 |

FOREIGN PATENT DOCUMENTS

| | | |
|---|---|---|
| JP | H10175188 A | 6/1998 |
| JP | 2000-308990 A | 11/2000 |
| JP | 2002-093881 A | 3/2002 |
| JP | 2013-184280 A | 9/2013 |
| JP | 2014-008441 A | 1/2014 |
| JP | 6029709 B1 | 11/2016 |
| WO | 2008/032591 A1 | 3/2008 |

* cited by examiner (A)

(B)

(C)

(A)

(B)

(A)

(B)

(C)

WORK ASSEMBLING DEVICE, CONTROL METHOD FOR WORK ASSEMBLING DEVICE, CONTROL PROGRAM FOR WORK ASSEMBLING DEVICE, AND RECORDING MEDIUM

TECHNICAL FIELD

The present invention relates to a work assembling device, a control method for the work assembling device, a control program for the work assembling device, and a recording medium.

BACKGROUND ART

In a conventional robot, arm members such as a robot turning base, an upper arm, a forearm, a wrist twisting member, a wrist bending member and a wrist rotating member are disposed on a robot fixing stage in sequence from the side of the robot fixing base, as stated in Patent Document 1. Each of the arm members is configured so as to be turnable by a corresponding driving motor.

When a work is pressurized in a predetermined direction by a robot, which is disposed in an arm member at the end of the robot, a work holding unit is turned by the driving of the driving motor of each arm member, so that the work which is held by the work holding unit, is pressurized in the tangential direction of this turning circle. Alternatively, the work holding unit may be disposed on a pressurizing actuator, such as a pressuring cylinder, which is disposed in an arm member at the end of the robot, so that the work, which is held by this work holding unit, is linearly moved by the driving of the actuator, and is pressurized in this linear direction.

CITATION LIST

Patent Document

Patent Document 1: Patent Publication JPH10-175188A

SUMMARY

Technical Problem

The prior art has the following problems.

(1) In the case of turning a work held by the work holding unit, which is disposed in the arm member at the end of the robot, by the driving of the driving motor of each arm member, so as to pressurize the work in the tangential direction of the turning circle, a large pressurizing force cannot be acquired unless the capacity of each driving motor is increased considerably.

(2) In the case of holding a work by the work holding unit disposed in the pressurizing actuator, which is disposed in the arm member at the end of the robot, and linearly moving the work by the driving of the actuator so as to pressurize the work in this linear direction, a large pressurizing force cannot be acquired unless the capacity of the actuator is increased considerably. At the same time, the turning unit, including the pivot of each arm member of the robot, must have a proof stress that is large enough to withstand the reactive force of the above mentioned pressurizing force generated by the driving of the pressurizing actuator.

It is an object of the present invention to apply a large pressurizing force to the work using a simple configuration of the work assembling device when the work is pressurized by the work assembling device using the robot.

Solution to Problem

The present invention is a work assembling device configured such that a root portion of a first arm is supported by a base via a first pivot, so as to be turnable around an axis line which is parallel with a main axis, a root portion of a second arm is supported by an end portion of the first arm via a second pivot so as to be turnable around an axis line which is parallel with the main axis, a work pressurizing unit is disposed on an end side of the second arm, and a work pressurized by the work pressurizing unit is assembled in a work assembling portion of an article, the work assembling device including a control unit configured to: assume a reference line connecting the root portion of the first arm and the end portion of the second arm on a plane which orthogonally intersects with the main axis; decrease an angle formed by the first arm and the reference line while increasing a crossing angle between the first arm and the second arm on the side facing the reference line; transform the first arm and the second arm from a bent state to a propped state that is close to a linear state along the reference line, and move the end portion of the second arm in a work pressurizing direction which is determined to be along the reference line; and assemble the work, which is pressurized by the work pressurizing unit disposed at the end portion of the second arm, to the work assembling portion of the article, the work assembling portion being located in the work pressurizing direction and held by an article holding table.

Advantageous Effects of Invention

According to the present invention, when a work is pressurized by a work assembling device using a robot, a large pressurizing force can be applied to the work using a simple configuration of the work assembling device.

BRIEF DESCRIPTION OF DRAWINGS

FIG. 2(A) is a perspective view, FIG. 2(B) is a side view, and FIG. 2(C) is a bottom view.

FIG. 7(A) is a schematic perspective view, FIG. 7(B) is a schematic explanatory drawing, and FIG. 7(C) is a schematic perspective view of the blade inserting step.

FIG. 10(A) is a schematic side view, and FIG. 10(B) is a schematic explanatory drawing.

FIG. 11(A) is a schematic cross-sectional view, FIG. 11(B) is a schematic plan view, and FIG. 11(C) is a schematic explanatory drawing of a one way clutch portion.

DESCRIPTION OF EMBODIMENTS

Figure 1:
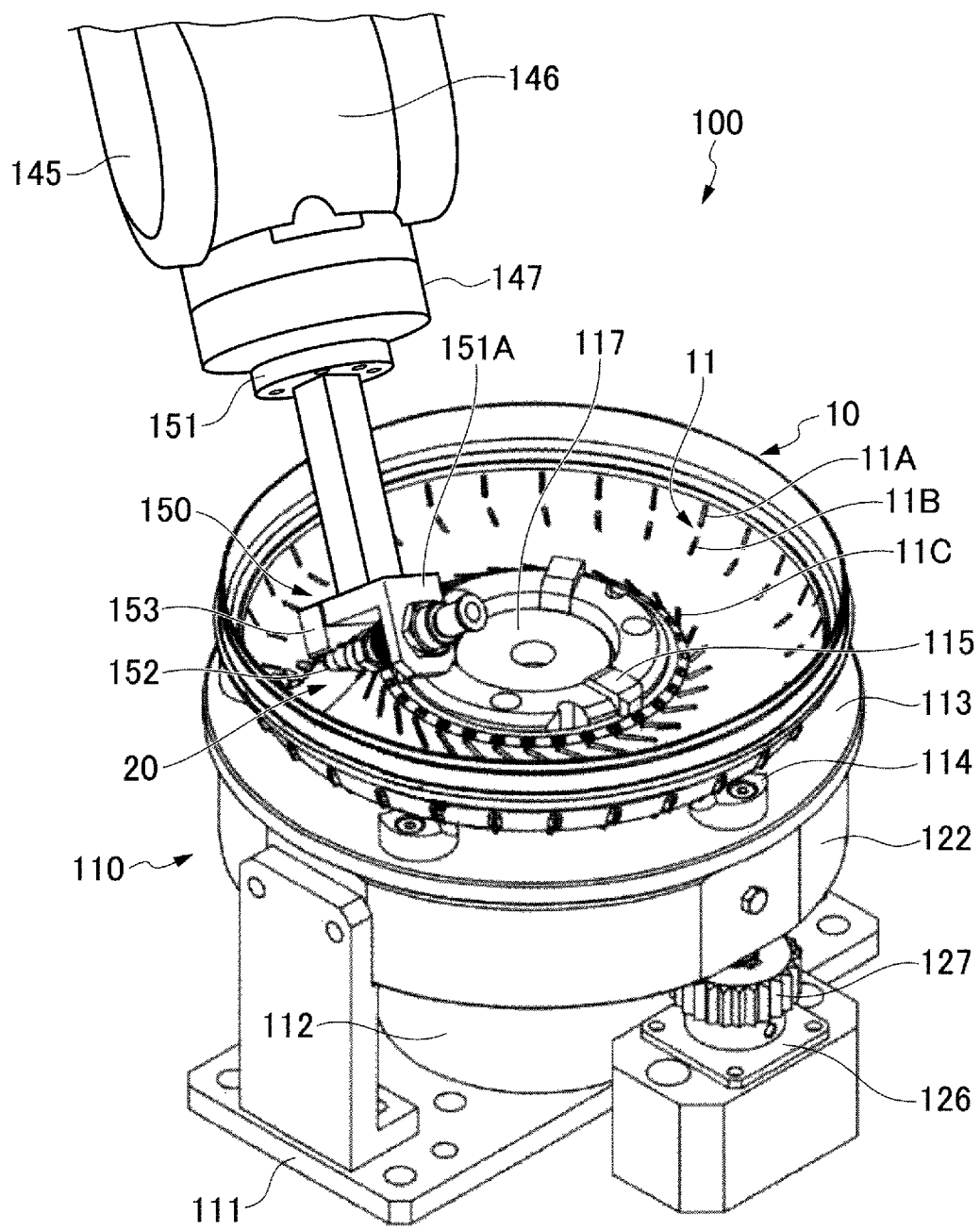
FIG. 1 is a schematic perspective view depicting a blade assembling device.

A blade assembling device (work assembling device) 100 of a torque convertor depicted in FIG. 1 is used for the automatic assembly of many blades (work) 20 in a groove row 11, which is a blade assembling portion (work assembling portion) of an impeller of the torque convertor or a shell 10 of a turbine.

Figure 2:
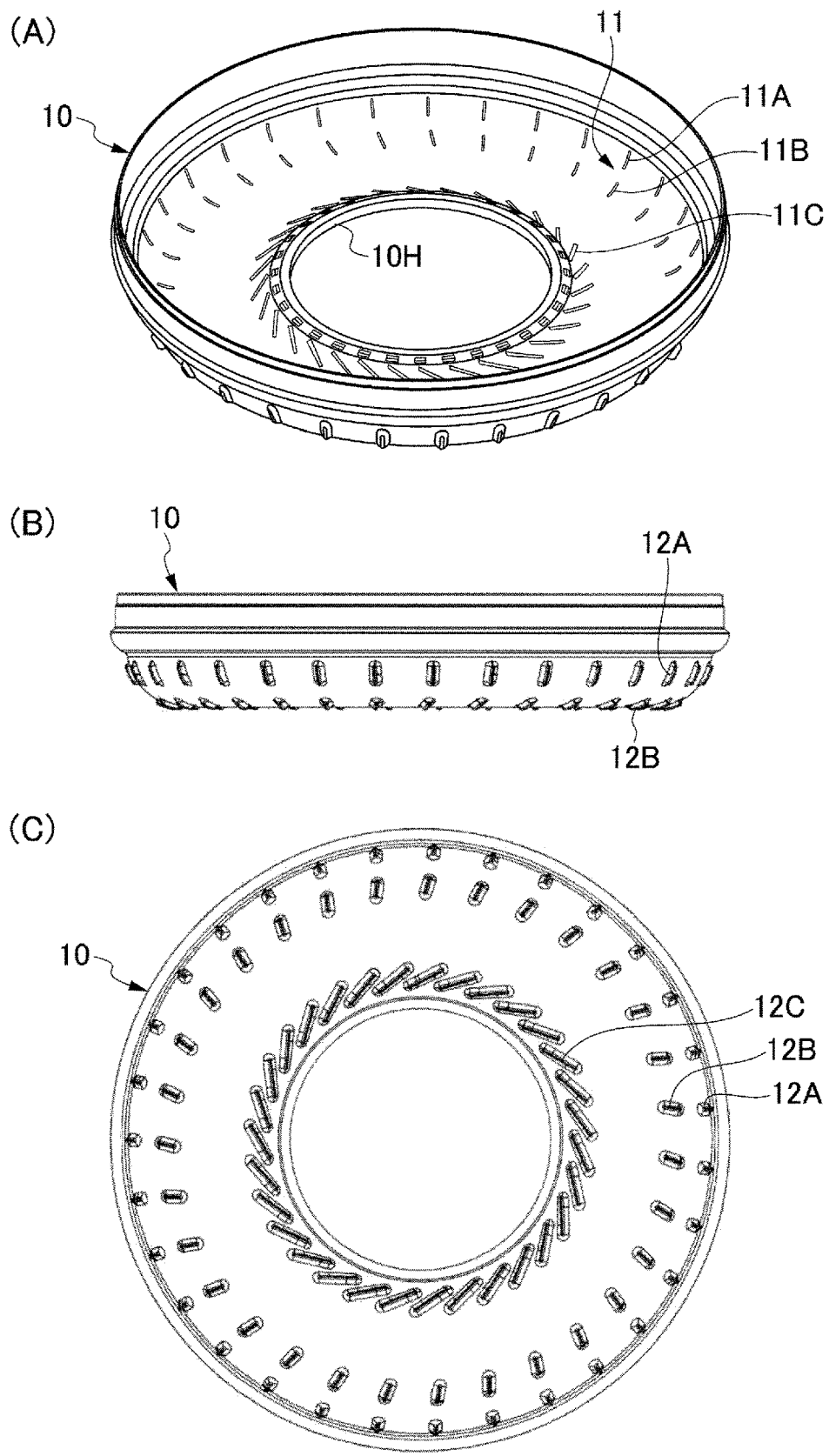
FIG. 2 depicts a shell, where

As illustrated in FIG. 2, the shell 10 is formed in a circular bowl shape, and has a mounting hole 10H at the center. In the shell 10, many sets of groove rows 11 are disposed on the inner curved surface at each position in the circumferential direction with a predetermined interval, and each groove row 11 is constituted by a plurality of (three in this example) grooves 11A to 11C having a predetermined arc shape respectively. On the outer curved surface of the shell 10, each convex portion 12A to 12C, which protrudes at each position corresponding to the grooves 11A to 11C of each groove row 11, is formed.

Figure 3:
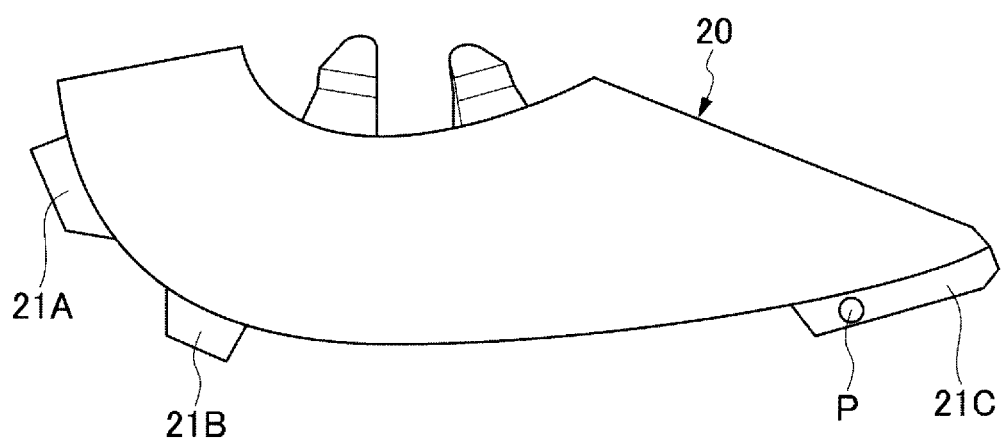
FIG. 3 is a schematic front view depicting a blade.

As illustrated in FIG. 3, the blade 20 is an air foil type plate that is molded into a three-dimensional shape, and has a plurality of (three in this example) hooks 21A to 21C on the lower side outer edge. At least one of the hooks 21A to 21C (hook 21C in this example) has an embossed protrusion P on the side face of the hook 21C, so as to be press-fitted into a groove 11C (a bent portion may be formed on the hook 21C so as to be press-fitted into the groove 11C).

Each of the hooks 21A to 21C of the blade 20 is completely inserted into each groove 11A to 11C of the shell 10 respectively, so that all the hooks 21A to 21C of one blade 20 are assembled into all the grooves 11A to 11C of the corresponding groove row of the shell 10, and this assembling operation is repeated for all the groove rows 11 of the shell 10, whereby a torque convertor component is manufactured.

The blade assembling device 100 includes a shell holding base 110 which holds the shell 10.

Figure 4:
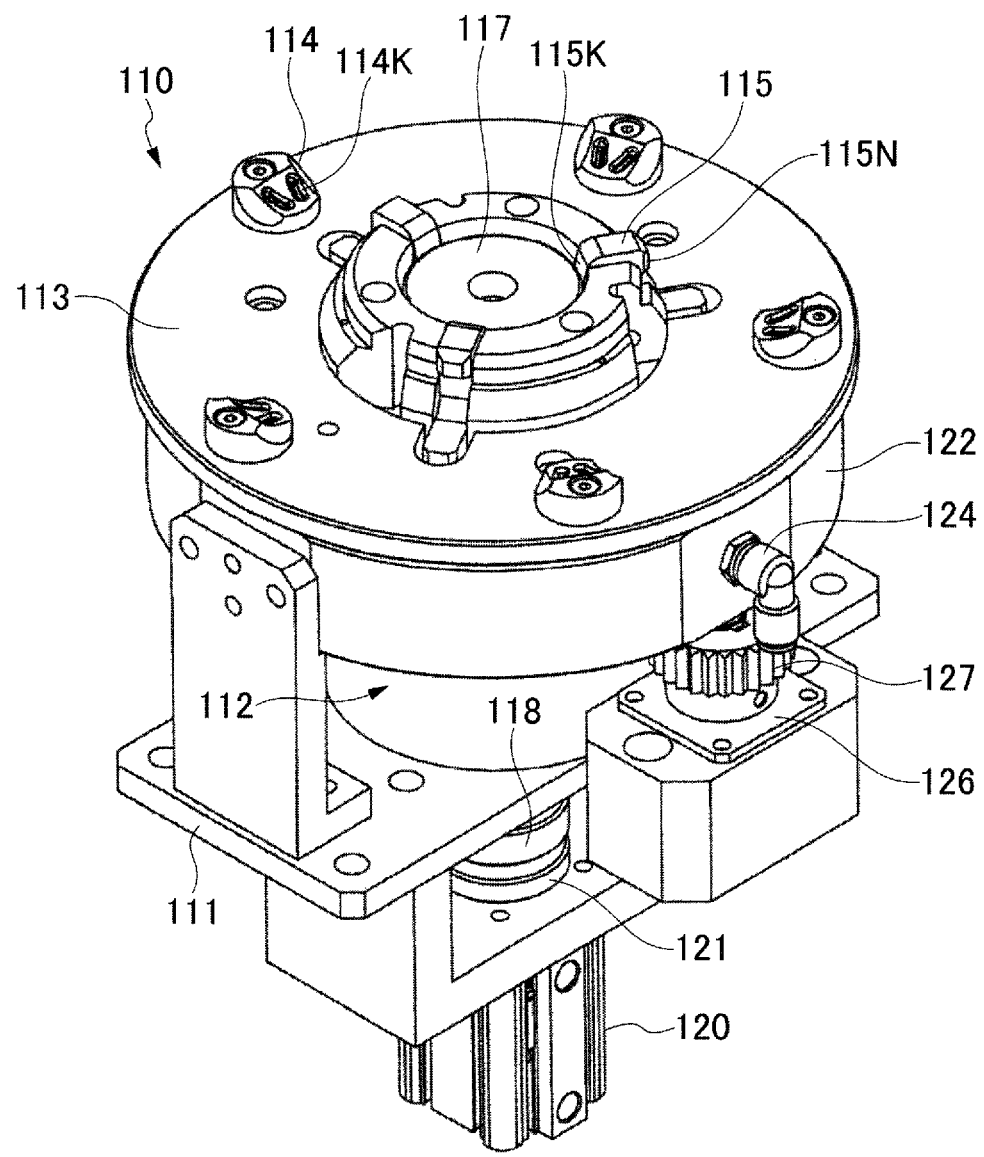
FIG. 4 is a schematic perspective view depicting a shell holding base.
Figure 5:
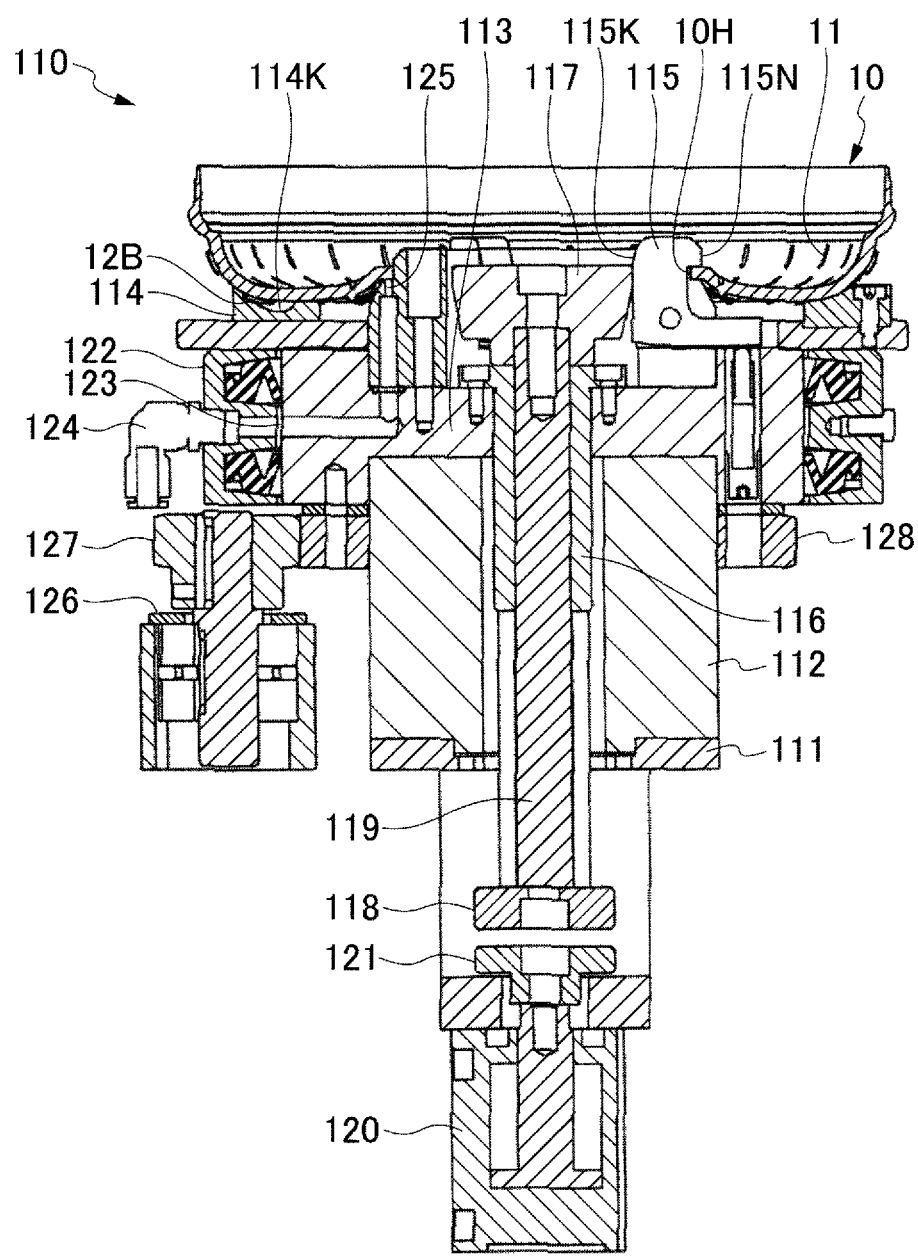
FIG. 5 is a cross-sectional view depicting the shell holding base.

As illustrated in FIG. 4 and FIG. 5, the shell holding base 110 supports a direct drive motor 112 disposed on a frame 111, and secures a shell holding table 113 on the motor 112. The shell holding base 110 includes a shell holding sheet 114 at a plurality of positions (five positions in this example) in the circumferential direction on the top face of the shell holding table 113. The shell holding base 110 pivotally supports a clamp hook 115, which is disposed in the radius direction of the center hole, at a plurality of positions (three positions in this example) around the center hold of the shell holding table 113. In the shell holding base 110, a slide rod 118, integrated with a clamp head 117, is slidably inserted in the inner periphery of a collar 116 enclosed in the center hole of the shell holding table 113 and the center hole of the motor 112, so that the clamp head 117 and the slide rod 118 are supported, so as to be linearly movable in the vertical direction along the axis of the hole of the collar 116. The clamp head 117 is constantly energized downward by a spring 119, which is installed between the collar 116 and the lower edge of the slide rod 118, and by being moved downward due to this energizing force, the clamp head 117 contacts a shoulder portion 115K of each clamp hook 115 from above, and presses the clamp hook 115 down so as to open outward. Then by the tip of the hook 115N of each clamp hook 115 which is opened outward, the inner periphery of the mounting hole 10H of the shell 10, placed on the shell holding sheet 114 of the shell holding table 113, is clamped, and the curved outer surface of the shell 10 is seated and fixed on the shell holding sheet 114. Thereby the shell 10 is held by the shell holding table 113. At this time, at least one of the convex portions 12A to 12C (convex portion 12C in this example) on the curved outer surface of the shell 10 is dropped into a concave portion 114K formed in the shell holding sheet 114, and is engaged therewith in advance during the stage of entering the shell holding sheet 114. The clamp head 117 suspension-supports a push-up cylinder 120 from the frame 111, and moves upward so as to be distant from the clamp hook 115 when a piston rod 121, protruding from the cylinder 120, pushes the slide rod 118 up against the energizing force of the spring 119. Thereby each clamp hook 115 swings inward by the gravitational force that is applied to this clamp hook 115, and releases the clamp of the tip hook portion 115N to the inner periphery of the mounting hole 10H of the shell 10.

In the shell holding base 110, the outer periphery of the shell holding table 113 is surrounded by an annular housing 122 disposed on the frame 111, so that an annular air chamber 123 is formed in the inner periphery of the annular housing 122 surrounding the outer periphery of the shell holding table 113. Through a pneumatic supply pipe 124 connected to the annular housing 122, pneumatic pressure is supplied to the annular air chamber 123, and the pneumatic pressure supplied to the annular air chamber 123 can be discharged from a pneumatic pressure delivery passage 125, which is opened in the shell holding table 113 to the upper area of the shell holding table 113. The seating of the curved outer surface of the shell 10 on the shell holding sheet 114 of the shell holding table 113 can be detected by the drop in the volume of air delivered from the pneumatic pressure delivery passage 125, which is detected by a pressure detector disposed on the pneumatic supply pipe 124.

In the shell holding base 110, the shell holding table 113 is intermittently moved (rotated in this example) in the positive direction (Na direction in FIG. 8) by the motor 112, so that the work assembling portion (groove row 11 of the shell 10 to which the blade 20 is assembled this time, in the case of this example) of the shell 10 held by the shell holding table 113 is positioned to a blade assembling operation position (work assembling operation position) by a later mentioned robot 140. At this time, in the shell holding base 110, a one-way clutch 126, which allows driving of the motor 112 to rotate the shell holding table 113 in the positive direction and stops driving the motor 112 in the opposite direction thereto, is disposed in the output path of the motor 112. In other words, the one-way clutch 126 is fixed to the frame 111, and a gear 127 disposed on the rotary shaft of the one-way clutch 126 and a gear 128 disposed on the outer periphery of the rotor of the motor 112 are engaged.

In order to assemble the blade 20 in the shell 10, the blade assembling device 100 has a robot 140, which holds the blade 20 and moves the blade 20 relative to the shell 10 which is held on the shell holding base 110.

Figure 6:
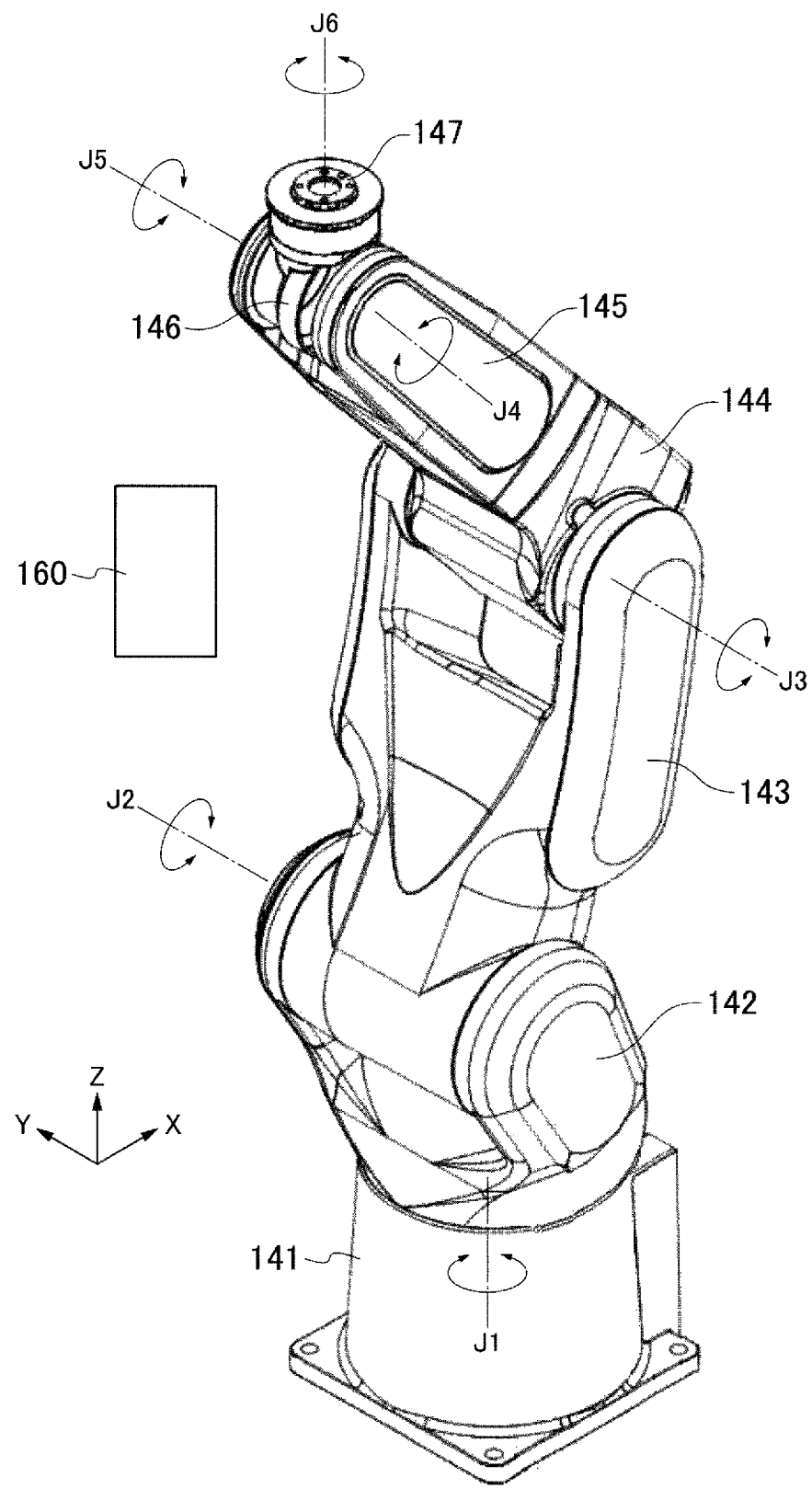
FIG. 6 is a schematic perspective view depicting a robot.

As illustrated in FIG. 6, on a robot fixing base 141, the robot 140 has a robot turning base 142, an upper arm (first arm) 143, a forearm (second arm) 144, a wrist twisting member 145, a wrist bending member 146, and a wrist rotating member 147, in sequence from the robot fixing base 141.

Here the robot 140 is a six-axis articulated robot constituted of a first axis J1, a second axis J2 . . . , and a sixth axis J6 in sequence from the robot fixing base 141. The first axis to the third axis are the basic three axes, and the fourth axis to the sixth axis are the wrist three axes, and each axis is a pivot where the turning direction is indicated by an arrow.

In the space indicated in FIG. 6 where the robot 140 is installed, the coordinate system is determined such that the upper right direction is the X axis, the direction perpendicular to the X axis is the Y axis (main axis), and the up direction is the Z axis on paper, thus each axis turns in the following direction.

First axis J1: turns the robot turning base 142 with respect to the robot fixing base 141 around an axis line that is parallel with the Z axis Second axis J2: moves the upper arm 143 to the front or back with respect to the robot turning base 142 around the axis line that is parallel with the Y axis (first pivot)

Third axis J3: moves the forearm 144 up or down with respect to the upper arm 143 around the axis line that is parallel with the Y axis (second pivot)

Fourth axis J4: rotates the wrist twisting member 145 with respect to the forearm 144 around the axis line that is parallel with the X axis or Z axis perpendicular to the Y axis Fifth axis J5: swings the wrist bending member 146 up or down with respect to the wrist twisting member 145 around the axis line that is parallel with the Y axis Sixth axis J6: rotates the wrist rotating member 147 with respect to the wrist bending member 146 around the axis line that is parallel with the X axis or Z axis perpendicular to the Y axis On the upper part of the robot turning base 142, which is turnably mounted on the robot fixing base 141, a first axis driving motor M1, a second axis driving motor M2 and reduction gears thereof are disposed. Inside the robot fixing base 141 and the robot turning base 142, driving elements to transfer the driving force of the first axis driving motor M1 to the first axis J1 are disposed. Inside the robot turning base 142 and the upper arm 143 which is turnably connected to the robot turning base 142, driving elements to transfer the driving force of the second axis driving motor M2 to the second axis J2 are disposed.

On the root portion of the forearm 144 which is turnably connected to the upper arm 143, a third axis driving motor M3 and reduction gears thereof are disposed. Inside the upper arm 143 and the forearm 144, driving elements to transfer the driving force of the third axis driving motor M3 to the third axis J3 are disposed.

On the root portion of the forearm 144, driving motors M4 to M6 for the fourth axis to the sixth axis and reduction gears thereof are also disposed. Inside the forearm 144 and the wrist twisting member 145 which is turnably connected to the forearm 144, driving elements to transfer the driving force of the fourth axis driving motor M4 to the fourth axis J4, are disposed. Inside the forearm 144, the wrist twisting member 145 and the wrist bending member 146 which is turnably connected to the wrist twisting member 145, driving elements to transfer the driving force of the fifth axis driving motor M5 to the fifth axis J5 are disposed. Inside the forearm 144, the wrist twisting member 145, the wrist bending member 146, and the wrist rotating member 147 which is turnably connected to the wrist bending member 146, driving elements, to transfer the driving force of the sixth axis driving motor M6 to the sixth axis J6 are disposed.

Figure 7:
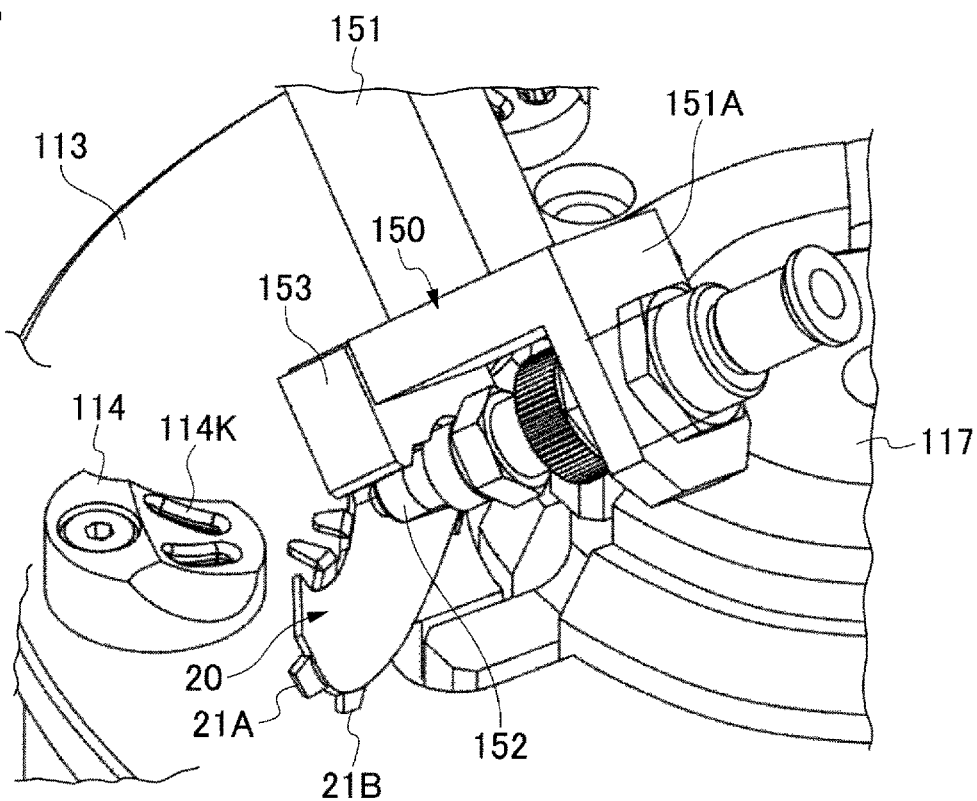
FIG. 7 depicts a blade inserting unit, where
Figure 7:
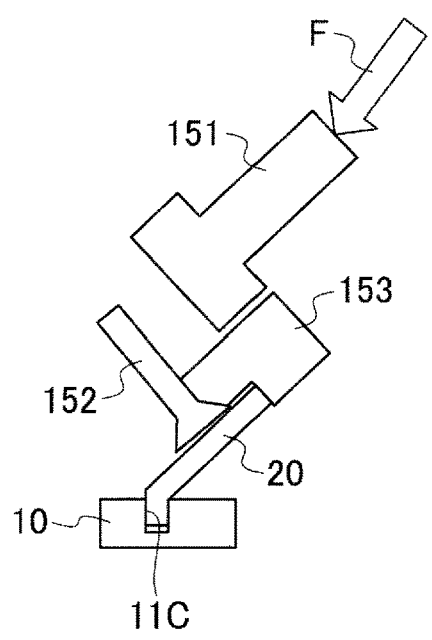
Figure 7:
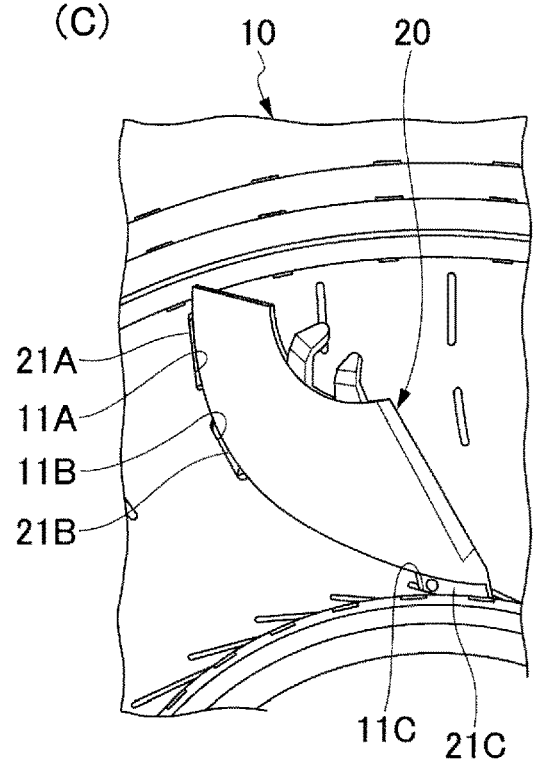

In the robot 140, a blade inserting unit (work inserting unit) 150 is disposed in the wrist rotating member 147 which is the arm end portion in this example. As illustrated in FIG. 1 and FIG. 7, the blade inserting unit 150 includes a connector 151 which is attached to the wrist rotating member 147 of the robot 140, an adsorption unit 152 which is a blade holding unit supported by a mounting unit 151A disposed in the connector 151, and a push-in unit 153 supported by the mounting unit 151A of the connector 151.

The adsorption unit 152 includes an adsorption pad connected to a vacuum supply pipe, and which adsorbs and holds a blade surface on one side of the blade 20, which is supplied by a blade supplying device (not illustrated). When the blade 20 adsorbed by the adsorption unit 152 is pressed against the inner curved surface (top face) of the shell 10, the blade 20 can be displaced from the arm end portion (wrist rotating member 147) of the robot 140 by the amount of elastic deformation of a rubber pad or the like constituting the adsorption unit 152. When the hooks 21A to 21C of the blade 20 are inserted into the grooves 11A to 11C of the shell 10, the push-in unit 153 contacts the upper outer edge, which is on the opposite side of the lower outer edge where the hooks 21A to 21C of the blade 20 are formed, so as to apply a downward pushing force toward the top face of the shell 10 to the blade 20.

By the control program installed in the control unit 160, the robot 140 operates the blade inserting unit 150 in accordance with the following (1) to (7), so that the blade 20 held by the adsorption unit 152 is moved relative to the shell 10, and each hook 21A to 21C of the blade 20 is inserted into each of the corresponding grooves 11A to 11C of the shell 10 respectively, as illustrated in FIG. 7(C). The robot 140 repeats this operation for all the groove rows 11 in the shell 10. The control program installed in the control unit 160 can be recorded in a computer-readable recording medium and be accessed in this format.

(1) The shell 10 is seated on the shell holding sheet 114 of the shell holding table 113 in the shell holding base 110. When it is detected that the outer curved surface of the shell 10 is seated on the shell holding sheet 114 of the shell holding table 113 by the detection result of a pressure detector disposed in the pneumatic supply pipe 124, the clamp hook 115 is clamped to the inner periphery of the mounting hole 10H of the shell 10, and holds the shell 10 on the shell holding table 113.

(2) The shell holding table 113 is intermittently rotated by the motor 112 of the shell holding base 110, so that the work assembling portion (groove row 11 of the shell 10 to which the blade 20 is assembled this time) of the shell 10 which is held on the shell holding table 113, is positioned at a position where the robot 140 performs a blade assembling operation.

Figure 8:
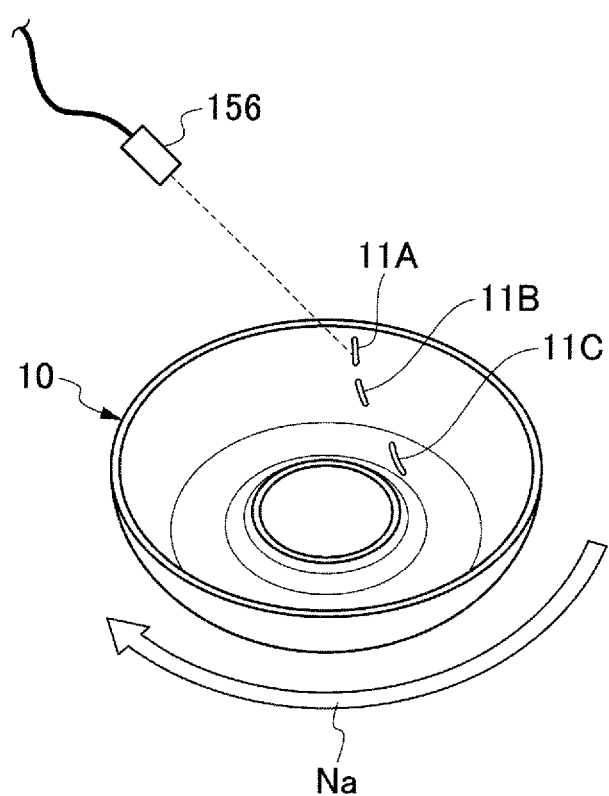
FIG. 8 is a schematic perspective view depicting a groove row formed in the shell.

The blade assembly operation position of the shell 10 is positioned according to the following i or ii.

i. As illustrated in FIG. 8, the groove row 11 of the shell 10, to which the blade 20 is first assembled, is positioned by stopping the motor 112 when the laser sensor 156 detects that the groove row 11 (groove 11A of the groove row 11) of the shell 10 matches with a laser light irradiating position, which is predetermined by the laser sensor 156.

ii. For the groove row 11 of the shell 10 to which the second or later blade 20 is assembled, the positioning is performed after intermittently rotating the motor 112 in the Na direction in FIG. 8 by a pitch interval of the adjacent groove rows 11 each time one blade 20 is assembled.

(3) One side of the surface of the blade 20 supplied by the blade supplying device (not illustrated) is adsorbed and held by the adsorption unit 152 of the blade inserting unit 150 disposed in the wrist rotating member 147 of the robot 140. The robot 140 recognizes the blade 20 using a camera (not illustrated), and adsorbs and holds the blade 20 using the adsorption unit 152, such that the blade 20 has a predetermined relative position and orientation with respect to the adsorption unit 152.

(4) As an initial stage fitting, the robot 140 moves the blade 20 held by the adsorption unit 152 relative to the groove 11A of the shell 10, so that at least one hook (hook 21A in this example) is inserted into the corresponding groove (groove 11A in this example) of the groove row 11 of the shell 10 held on the shell holding base 110. This initial fitting is performed in accordance with the following i or ii.

i. The hook 21A of the blade 20 held by the adsorption unit 152 is moved toward the groove 11A of the shell 10, and is directly inserted into the groove 11A by the adsorbing force of the adsorption unit 152.

ii. After disposing the hook 21A of the blade 20 held by the adsorption unit 152 in front of the corresponding groove 11A in the circumferential direction of the shell 10 (in front of the groove 11A along the direction of the robot 140 moving the hook 21A of the blade 20 to the groove 11A of the shell 10 (arrow A direction in FIG. 9(B))) (position of Ka in FIG. 9(A)), the hook 21A is pressed diagonally downward toward the front with respect to the top face (inner curved surface) of the shell 10 by the adsorbing force of the adsorption unit 152, and in this state, the hook 21A is slid into the corresponding groove 11A from the front of the groove 11A in the arrow A direction in FIG. 9(B), so that the hook 21A is inserted into the groove 11A.

Figure 9:
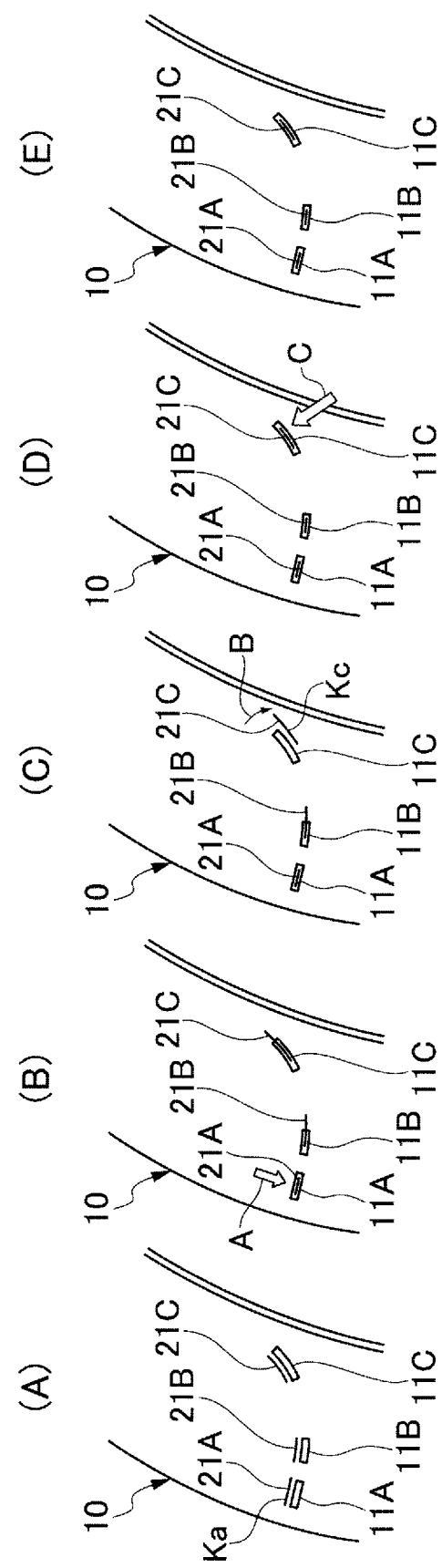
FIG. 9 is a process drawing depicting a step of inserting each hook, of the blade.

(5) In the state of the hook 21A of the blade 20 being inserted in the groove 11A of the shell 10, as described above in (4), the robot 140 lowers the blade 20 using the adsorption unit 152 so as to slightly insert the tip of the hook 21B into the groove 11B, then twists the blade 20 in the B direction in FIG. 9(C) for the degree of play of the hooks 21A and 21B with respect to the grooves 11A and 11B (the hook 21C passes over the groove 11C and is positioned on the opposite side of the groove 11C).

(6) After inserting the hooks 21A and 21B of the blade 20 as described in (4) and (5), the robot 140 disposes the last hook 21C of the blade 20 in front of the groove 11C in the circumferential direction of the shell 10 (in front of the groove 11C (in front of the opposite side of the groove) along the direction of the robot 140 moving the hook 21C of the blade 20 to the groove 11C of the shell 10 from the position of the groove 11C passed over in the above mentioned (5) (arrow C direction in FIG. 9(D))) (position of Kc in FIG. 9(C)), the hook 21C is pressed to the top face (inner curved surface) of the shell 10 by the adsorption force of the adsorption unit 152, and in this state, the hook 21C is slid into the corresponding groove 11C from the front of the groove 11C in the arrow C direction so that the hook 21C is inserted into the groove 11C (FIG. 9(D)). Thereby all the hooks 21A to 21C of the blade 20 are inserted into all the corresponding grooves 11A to 11C of the shell 10.

In the above mentioned (5), the hook 21C of the blade 20 passes over the groove 11C of the shell 10 and is positioned in front of the opposite side of the groove 11C. This is because the hook 21C can more smoothly be slid and inserted into the groove 11C when the hook 21C is advanced relative to the groove 11C in the arrow C direction in FIG. 9(D), due to the shape of the inner curved surface around the groove 11C in the shell 10. Therefore depending on the shape of the inner curved surface around the groove 11C in the shell 10, the hook 21C may be slid and inserted into the groove 11C from the front of the groove 11C, without passing over the groove 11C, instead of positioning the hook 21C of the blade 20 in front on the opposite side of the groove 11C of the shell 10, as described in (5).

(7) After inserting all the hooks 21A to 21C of the blade 20 into all the corresponding grooves 11A to 11C of the shell 10 respectively, as described above in (6), the robot 140 pushes the blade 20 downward into the top face of the shell 10 by a pushing force F of the push-in unit 153 of the blade inserting unit 150 (FIG. 7(B)), so that all the hooks 21A to 21C are completely inserted to the base of the corresponding grooves 11A to 11C respectively (FIG. 9(E)). As illustrated in FIG. 7(B), the push-in unit 153 pushes the upper outer edge, which is vertically on the opposite side of the lower outer edge where the hooks 21A to 21C of the blade 20 are disposed, diagonally downward toward the front.

Thereby the protrusion P on the side face of the hook 21C (or curved portion disposed on the hook 21C) of the blade 20 is press-fitted to the side wall of the groove 11C of the shell 10, and all the hooks 21A to 21C are completely fitted into all the grooves 11A to 11C without disengaging.

The adsorption unit 152 of the blade inserting unit 150 displaceably holds the blade 20 by bending for the amount of elastic deformation of the rubber pad or the like in each operation described above in (4) to (7). Therefore when each hook 21A to 21C of the blade 20 is inserted into the corresponding groove 11A to 11C of the shell 10, or when each hook 21A to 21C is completely pushed to the base of the groove 11A to 11C by the push-in unit 153, the adsorption unit 152 flexibly holds the blade 20 so that each hook 21A to 21C can be inserted or pushed in along the groove direction of the groove 11A to 11C.

If all the hooks 21A to 21C of the blade 20 can be completely inserted to the base of the corresponding grooves 11A to 11C of the shell 10 by each operation described above in (4) to (6), the robot 140 need not perform the push-in operation using the push-in unit 153 described above in (7).

Now a booster mechanism of the robot 140 in the blade assembling device 100 will be described. With this mechanism, when the blade inserting unit 150 disposed in the robot 140 is operated by the control unit 160, as described above in (1) to (7), the pushing force F (pressurizing force) of the push-in unit 153 of the blade inserting unit 150, to push the blade 20 into the top face of the shell 10 in the above mentioned (7), can be increased. In the above mentioned XYZ coordinate space in which the robot 140 is installed, it is assumed that one XZ plane is the main plane, and the Y axis, which orthogonally intersects with the XZ plane, is the main axis.

Here on the main plane (XZ plane), the robot 140 turns the upper arm 143, the forearm 144 and the wrist bending member 146 around the axis line, which is parallel with the main axis (Y axis which orthogonally intersects with the main plane (XZ plane)), so that the upper arm 143, the forearm 144 and the wrist bending member 146 can be bent away from each other.

In other words, as described above, the robot 140 of the blade assembling device 100 supports the root portion of the upper arm 143 (first arm) to the robot turning base 142 via the second axis J2 (first pivot), so that the upper arm 143 can turn around the axis line which is parallel with the main axis (Y axis), and supports the root portion of the forearm 144 (second arm) to the end portion of the upper arm 143 (first arm) via the third axis J3 (second pivot), so that the forearm 144 can turn around the axis line which is parallel with the main axis (Y axis). Further, the robot 140 supports the blade inserting unit 150 (adsorption unit 152, push-in unit 153) (work pressurizing unit) at the end portion of the forearm 144 via the wrist twisting member 145, the wrist bending member 146, and the wrist rotating member 147, and supports the wrist bending member 146, which connects the blade inserting unit 150 to the forearm 144 and the wrist twisting member 145 via the fifth axis J5, so that the wrist bending member 146 can turn around the axis line which is parallel with the main axis (Y axis). In this way, the blade assembling device 100 assembles the blade (work) 20 which is pressurized by the push-in unit 153 of the blade inserting unit 150 disposed at the end portion of the forearm 144 to the groove row (work assembling portion) 11 of the shell (article) 10.

Figure 10:
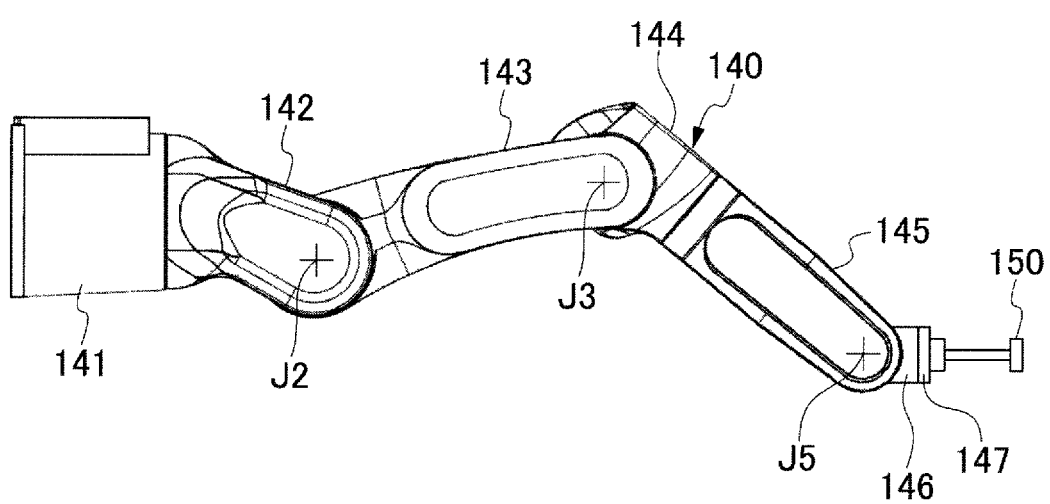
FIG. 10 depicting a booster mechanism of the robot, where
Figure 10:
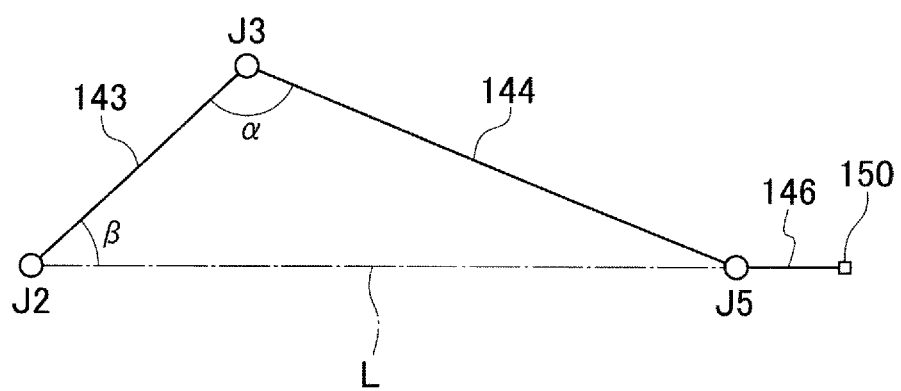

Then as illustrated in FIG. 10, the robot 140 controls the upper arm 143 and the forearm 144 as follows according to the control program installed in the control unit 160, so as to implement the booster mechanism as described below. The control program installed in the control unit 160 may be recorded on a computer-readable recording medium and accessed in this format.

It is assumed that a reference line L connects a root portion of the forearm 144 (a turning portion to turn the forearm 144 around an axis line which is parallel with the main axis (Y axis), the second axis J2 in this example) and an end portion of the forearm 144 (a turning portion to turn the blade inserting unit 150 (adsorption unit 152, push-in unit 153) with respect to the forearm 144, around the axis line which is parallel with the main axis (Y axis), the fifth axis J5 in this example).

An angle β formed by the upper arm 143 and the reference line L is decreased while increasing a crossing angle α between the upper arm 143 and the forearm 144 on the side facing the reference line L, so as to move the end portion of the forearm 144 (fifth axis J5) in the work pressurizing direction (F direction), which is determined to be along the reference line L.

The angle α is increased by controlling the third axis driving motor M3. The angle β is decreased by controlling the second axis driving motor M2.

Thereby the blade 20, held by the adsorption unit 152 of the blade inserting unit 150 which is disposed in the forearm 144 via the wrist twisting member 145, the wrist bending member 146 and the wrist rotating member 147, is pushed in the above mentioned work pressurizing direction (F direction) by the push-in unit 153 (work pressurizing unit) of the blade inserting unit 150, and each hook 21A to 21C of the blade 20 is completely inserted to the base of the corresponding groove 11A to 11C of the shell 10 with a large pressurizing force F.

Further, as described above, in the robot 140, the wrist bending member 146 is disposed in the wrist twisting member 145 at the end side of the forearm 144 via the fifth axis J5, so as to be turnable around the axis line which is parallel with the main axis (Y axis), and the blade inserting unit 150 is disposed at the end portion of the wrist bending member 146 via the wrist rotating member 147. Therefore in the robot 140, the end portion of the forearm 144 (fifth axis (J5), which allows to turn the blade inserting unit 150 with respect to the forearm 144 around the axis line which is parallel with the main axis (Y axis)), is moved in the work pressurizing direction (F direction) along the reference line L as mentioned above, and the wrist bending member 146 is positioned on the same line in the work pressurizing direction (F direction) along the reference line L. The positioning of the wrist bending member 146 is controlled by the fifth axis driving motor M5.

As a consequence, the following functional effects can be implemented according to this example.

(a) The reference line L, connecting the root portion of the first arm (upper arm 143) and the end portion of the second arm (forearm 144), is assumed to be on the main plane (XZ plane) which orthogonally intersects the main axis (Y axis) in the robot 140, an angle β formed by the first arm (upper arm 143) and the reference line L is decreased while increasing the crossing angle α between the first arm (upper arm 143) and the second arm (forearm 144) on the side facing the reference line L, the end portion of the second arm (forearm 144) is moved in the work pressurizing direction (F direction) which is determined to be along the reference line L, and the blade 20 is pressurized in the work pressurizing direction (F direction) by the end portion of the second arm (forearm 144).

As the first arm (upper arm 143) and the second arm (forearm 144) are transformed from a bent state to a linear state along the reference line L on the main plane (XZ plane), the first arm and the second arm are brought into a propped state such that a booster mechanism (toggle mechanism) is implemented, and the end portion of the second arm (forearm 144) moves in the work pressurizing direction (F direction), and applies a large pressurizing force F in this direction.

(b) When the root portion of the wrist bending member is disposed on the end side of the second arm (forearm 144) of the robot 140 so as to be turnable around the axis line which is parallel with the main axis, the end portion of the second arm (forearm 144) is moved in the work pressurizing direction (F direction) which is determined to be along the reference line L, and the wrist bending member 146 is positioned in the work pressurizing direction (F direction).

The reactive force of the pressurizing force F, that acts on the wrist bending member 146, passes through a pivot (fifth axis J5) around which the root portion of the wrist bending member 146 turns with respect to the end side of the second arm (forearm 144), therefore the turning portion of the wrist bending member 146, including the pivot (fifth axis J5), need not have a large proof stress against the reactive force of the pressurizing force F.

Now a function of the one-way clutch 126, disposed on the output path of the motor 112 which intermittently moves the shell holding table 113 in the above mentioned positive direction on the shell holding base 110, will be described.

Figure 11:
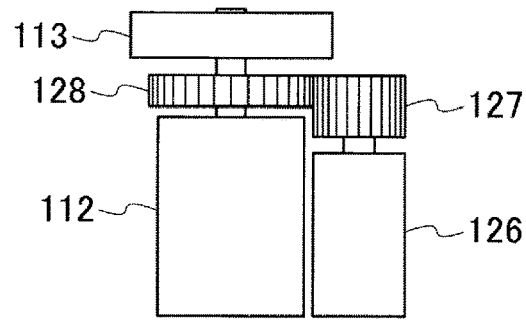
FIG. 11 is a back stop mechanism of the shell holding base, where
Figure 11:
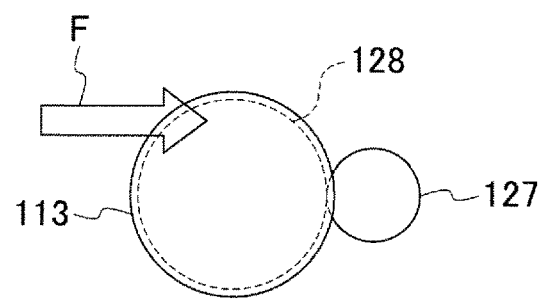
Figure 11:
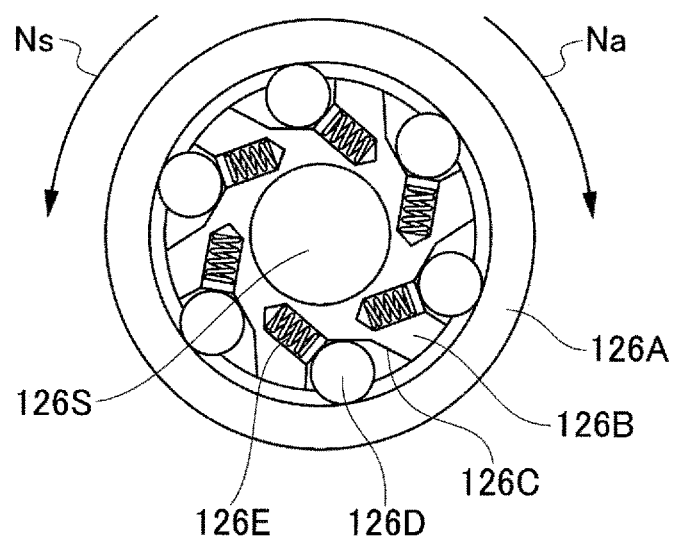

For the one-way clutch 126, a commercial one-way clutch can be used. The one-way clutch 126 is, for example, a cam type illustrated in FIG. 11, and includes: an outer ring 126A which is fixed to the frame 111; an inner ring 126B which is disposed on the rotary shaft 126S to which a gear 127 is fixed; rollers 126D which are disposed on the cam surfaces 126C formed at a plurality of positions in the circumferential direction on the outer side of the inner ring 126B; and springs 126E which energize the rollers 126D toward the inside of the outer ring 126A respectively. When the rotary shaft 126S of the one-way clutch 126 starts to rotate in one direction (reverse rotation direction Ns), the contact surface pressure between the cam surface 126C and the rollers 126D increases, which stops the rotation of the rotary shaft 126S, and then stops the rotation (reverse rotation) of the motor 112. When the rotary shaft 126S of the one-way clutch 126 starts to rotate in the opposite direction (normal rotation direction Na), the contact surface pressure between the cam surfaces 126C and the rollers 126D decreases, which allows rotation of the rotary shaft 126S, and then allows rotation (normal rotation) of the motor 112.

As a consequence, the following functional effects can be implemented according to this example. The shell 10, to which the blade 20 is assembled by being pressurized with a large pressurizing force F of the push-in unit 153 (work pressurizing unit) of the work inserting unit 150 disposed on the end side of the second arm (forearm 144), is held on an article holding table 113. The motor 112, which intermittently moves the article holding table 113 in the positive direction, so as to position the groove row 11, serving as the blade assembling portion, of the shell 10 held by the article holding table 113, to the blade assembling operation position by the robot 140, is in the stopped state when the blade 20 is assembled to the groove row 11, serving as the blade assembling portion, of the shell 10, and receives a large pressurizing force F for the robot 140 to move the article holding table 113 in the reverse direction of the above mentioned normal direction via the blade 20 and the shell 10. At this time, the motor 112 of the article holding table 113 is stopped to reversely rotate by the one-way clutch 126 even if the large pressurizing force F is received. Therefore it is sufficient that the motor 112 of the article holding table 113 can output torque that is sufficient to move the groove row 11, serving as the blade assembling portion, of the shell 10 held on the article holding table 113 to the blade assembling operation position by the robot 140, that is, the small capacity motor 112 can receive the large pressurizing force F and continuously position the shell 10 to the blade assembling operation position stably.

An example of the present invention has been described in detail with reference to the drawings, but a concrete configuration of the present invention is not limited to this example, and a design change and the like within the scope not departing from the essence of the present invention are included in the present invention. For example, the robot of the present invention is not limited to the robot used for the blade assembling device for the torque convertor, but may be [a robot] that is widely used for a device which pressures and assembles various work to the article, a device which simply pressurizes various work on the article and the like.

INDUSTRIAL APPLICABILITY

According to the present invention, when a work is pressurized by a work assembling device using a robot, a large pressurizing force can be applied to the work using a simple configuration of the work assembling device.

REFERENCE SIGNS LIST

10 Shell (article)
20 Blade (work)
112 Motor
113 Shell holding table (article holding table)
126 One-way clutch
140 Robot
142 Robot turning base
143 Upper arm (first arm)
144 Forearm (second arm)
146 Wrist bending member
150 Work inserting unit
153 Push-in unit (work pressurizing unit)
160 Control unit
α Crossing angle
β Angle
L Reference line
J2 Second axis (first pivot)
J3 Third axis (second pivot)
J5 Fifth axis (end portion of second arm)
F Pressurizing force

What is claimed is:

1. A work assembling device configured such that a root portion of a first arm is supported by a base via a first pivot so as to be turnable around an axis line which is parallel with a main axis, a root portion of a second arm is supported by an end portion of the first arm via a second pivot so as to be turnable around an axis line which is parallel with the main axis, a work pressurizing unit is disposed on an end side of the second arm, and a work pressurized by the work pressurizing unit is assembled into a groove formed in a work assembling portion of an article, the work assembling device comprising a control unit configured to: assume a reference line connecting the root portion of the first arm and the end portion of the second arm on a plane which orthogonally intersects with the main axis; decrease an angle formed by the first arm and the reference line while increasing a crossing angle between the first arm and the second arm on the side facing the reference line; transform the first arm and the second arm from a bent state to a propped state that is close to a linear state along the reference line, and move the end portion of the second arm in a work pressurizing direction which is determined to be along the reference line to apply a pressurizing force to the work pressurizing unit; and assemble the work, which is pressurized by the work pressurizing unit disposed at the end portion of the second arm, to the groove formed in the work assembling portion of the article, the work assembling portion being located in the work pressurizing direction and held by an article holding table;

wherein the work pressurizing unit is pressurized only by the motion of the end portion of the second arm in the work pressurizing direction.

2. The work assembling device according to claim 1, wherein when a root portion of a wrist bending member is disposed on the end side of the second arm so as to be turnable around the axis line which is parallel with the main axis, and the work pressurizing unit is disposed on an end side of the wrist bending member, the end portion of the second arm is moved in the work pressurizing direction which is determined to be along the reference line, and the wrist bending member is positioned in the work pressurizing direction.

3. The work assembling device according to claim 2, comprising:

an article holding table configured to hold an article to which a work pressurized by the work pressurizing unit disposed on the end side of the second arm is assembled; and a motor configured to move the article holding table intermittently in a positive direction, so that the work assembling portion of the article held by the article holding table is positioned at a work assembling operation position, wherein a one-way clutch is disposed on an output path of the motor, the one-way clutch allowing operation of the motor to move the article holding table in the positive direction, and stopping operation of the motor to move the article holding table in an opposite direction thereto, when the work pressurizing unit disposed on the end side of the second arm moves the article holding table in the opposite direction to the positive direction using pressurizing force applied to the article holding table via the work and the article.

4. The work assembling device according to claim 1, comprising:

an article holding table configured to hold an article to which the work pressurized by the work pressurizing unit disposed on the end side of the second arm is assembled; and a motor configured to move the article holding table intermittently in a positive direction, so that the work assembling portion of the article held by the article holding table is positioned at a work assembling operation position, wherein a one-way clutch is disposed on an output path of the motor, the one-way clutch allowing operation of the motor to move the article holding table in the positive direction, and stopping operation of the motor to move the article holding table in an opposite direction thereto, when the work pressurizing unit disposed on the end side of the second arm moves the article holding table in the opposite direction to the positive direction using pressurizing force applied to the article holding table via the work and the article.

5. A control method for a work assembling device configured such that a root portion of a first arm is supported by a base via a first pivot so as to be turnable around an axis line which is parallel with a main axis, a root portion of a second arm is supported by an end portion of the first arm via a second pivot so as to be turnable around an axis line which is parallel with the main axis, a work pressurizing unit is disposed on an end side of the second arm, and a work pressurized by the work pressurizing unit is assembled into a groove formed in a work assembling portion of an article, the control method comprising performing control to: assume a reference line connecting the root portion of the first arm and the end portion of the second arm on a plane which orthogonally intersects with the main axis; decrease an angle formed by the first arm and the reference line while increasing a crossing angle between the first arm and the second arm on the side facing the reference line; transform the first arm and the second arm from a bent state to a propped state that is close to a linear state along the reference line, and move the end portion of the second arm in a work pressurizing direction which is determined to be along the reference line to apply a pressurizing force to the work pressurizing unit; and assemble the work, which is pressurized by the work pressurizing unit disposed at the end portion of the second arm, to the groove formed in the work assembling portion of the article, the work assembling portion being located in the work pressurizing direction and held by an article holding table;

wherein the work pressurizing unit is pressurized only by the motion of the end portion of the second arm in the work pressurizing direction.

6. A control program for a work assembling device stored on a non-transitory computer readable recording medium, the control program configured such that a root portion of a first arm is supported by a base via a first pivot so as to be turnable around an axis line which is parallel with a main axis, a root portion of a second arm is supported by an end portion of the first arm via a second pivot so as to be turnable around an axis line which is parallel with the main axis, a work pressurizing unit is disposed on an end side of the second arm, and a work pressurized by the work pressurizing unit is assembled into a groove formed in a work assembling portion of an article, the control program causing to execute a process of performing control to: assume a reference line connecting the root portion of the first arm and the end portion of the second arm on a plane which orthogonally intersects with the main axis; decrease an angle formed by the first arm and the reference line while increasing a crossing angle between the first arm and the second arm on the side facing the reference line; transform the first arm and the second arm from a bent state to a propped state that is close to a linear state along the reference line, and move the end portion of the second arm in a work pressurizing direction which is determined to be along the reference line to apply a pressurizing force to the work pressurizing unit; and assemble the work, which is pressurized by the work pressurizing unit disposed at the end portion of the second arm, to the groove formed in the work assembling portion of the article, the work assembling portion being located in the work pressurizing direction and held by an article holding table;

wherein the work pressurizing unit is pressurized only by the motion of the end portion of the second arm in the work pressurizing direction.

* * * * *